United States Patent [19]
Herbreteau et al.

[11] Patent Number: 4,554,546
[45] Date of Patent: Nov. 19, 1985

[54] RECEIVER FOR A SOUNDER PERMITTING THE DETECTION AND MEASUREMENT OF PHONOMENA LINKED WITH THE EARTHS ENVIRONMENT

[75] Inventors: Louis Herbreteau, Bretigny sur Orge; Alain Le Roy, Vanves, both of France

[73] Assignee: Commissariat a l'Energie Atomique, Paris, France

[21] Appl. No.: 442,581

[22] Filed: Nov. 18, 1982

[30] Foreign Application Priority Data

Nov. 24, 1981 [FR] France .................................. 81 21969

[51] Int. Cl.[4] .......................... G01S 13/95; G01S 7/40
[52] U.S. Cl. ..................................... 343/5 W; 343/17.7
[58] Field of Search ................ 343/5 W, 17.2 R, 17.7, 343/7 AG; 367/43, 47, 65, 98, 13

[56] References Cited

U.S. PATENT DOCUMENTS

| 2,995,748 | 8/1961 | Cole et al. | 343/17.7 |
|---|---|---|---|
| 3,063,034 | 11/1962 | Lee | 367/43 |
| 3,078,460 | 2/1963 | Werner et al. | 343/7 AG |
| 3,158,818 | 11/1964 | Plumpe | 343/7 AG |
| 4,041,490 | 8/1977 | Watt | 343/17.7 |
| 4,138,645 | 2/1979 | Parato | 343/17.7 X |
| 4,206,510 | 6/1980 | Strait | 367/98 X |
| 4,356,487 | 10/1982 | Herbreteau | 343/5 W |

FOREIGN PATENT DOCUMENTS

| 2019915 | 7/1970 | France . | |
| 2462720 | 2/1981 | France . | |
| 809019 | 6/1978 | U.S.S.R. | 343/5 W |

OTHER PUBLICATIONS

IEEE Journal of Oceanic Engineering, vol. OE-2, No. 2, Apr. 1977, W. L. Grantham et al.: "The SeaSat-A Satellite Scatterometer", pp. 200–206.
IEEE Transactions on Microwave Theory and Techniques, vol. MIT-27, No. 3, Mar. 1979, H. I. Cong et al.: "The Low-Noise 115-GHz Receiver on the Columbia-GISS 4-ft Radio Telescope", pp. 245–248.

Primary Examiner—T. H. Tubbesing
Assistant Examiner—Brian S. Steinberger

[57] ABSTRACT

Receiver for a sounder for the detection and measurement of phenomena linked with the earth's environment, wherein it comprises a reception channel, whereof one input receives the echo signals of the electromagnetic signals emitted towards the phenomenon, an electromagnetic signal frequency shift and amplitude-calibration test channel, whereby the reception channel comprises a first stage having in series means for filtering, attenuating and amplifying the echo signals received, a second stage comprising in series means for the frequency conversion attenuation, filtering and amplification of the signals received from the first stage, and a third stage comprising in series means for frequency conversion, filtering and amplification of the signals received from the second stage, the attenuation means of the first and second stages being independently controllable for each frequency of the signals which they receive, in such a way that the signals from the corresponding amplification means have an amplitude higher than the amplitude of the distortions produced by the reception channel and the amplitude of the interference signals received by the reception channel.

8 Claims, 1 Drawing Figure

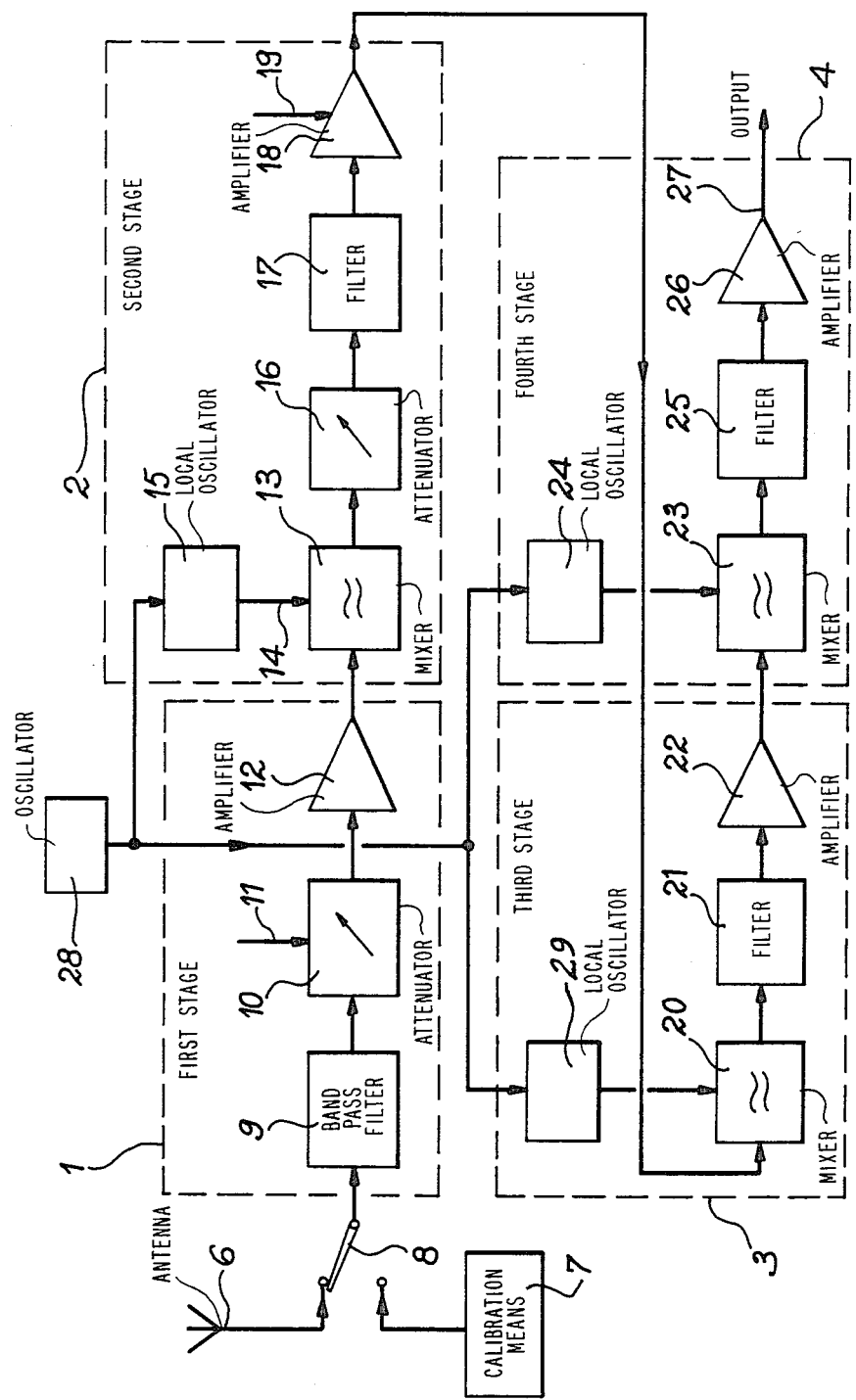

RECEIVER FOR A SOUNDER PERMITTING THE DETECTION AND MEASUREMENT OF PHONOMENA LINKED WITH THE EARTHS ENVIRONMENT

BACKGROUND OF THE INVENTION

The present invention relates to a receiver for a sounder permitting the detection and measurement of phenomena connected with the earth's environment. The receiver is applicable to sounders, which make it possible to study phenomena linked with the earth's environment and particularly sounders used for studying the ionosphere and especially the study of short-term, low-amplitude modifications of the electron density gradient of the ionosphere. This receiver can also be used in sounders making it possible to study other phenomena, such as e.g. the study or monitoring of sea swells.

It is known that the ionosphere is the region at altitudes above 70 km in which, under the influence of solar radiation, a fraction of the atoms and molecules forming the earth's atmosphere is subdivided into positive ions and negative electrons. At hig-h altitudes, the rarefaction of the atmosphere is such that the electrons have a low density. At low altitudes, the atmosphere is much more dense. However, the energy of the solar radiation has been consumed at high altitude for the ionization of the molecules and the residual energy of this radiation is no longer sufficient to produce a large ionization. As a result, at low altitude, the ionosphere forms a shield protecting the surface of the earth against certain dangerous ultraviolet rays. The greatest ionization takes place at an altitude of about 200 km and reaches a few hundred thousand electrons/cm$^3$ ($10^5$ to $10^6$/cm$^3$). Thus, the most characteristic quantity of the ionosphere is the electron density or ionization density. Knowledge of this density at different altitudes makes it possible to detect the disturbances undergone by the ionosphere as a result of events taking place on earth (e.g. earthquakes). The knowledge of the electron density of the ionosphere also makes it possible to study sudden ionospheric disturbances produced by solar flares. These disturbances lead to a sudden increase in electromagnetic radiation emitted towards the earth and particularly in the X-ray range. These solar eruptions can also give rise to significant fluctuations in the earth's magnetic field, called magnetic storms. These storms give rise to an increase in ionization in auroral regions and their effects can be observed down to low altitude regions. Finally, the ionosphere is subJect to large day and night oscillations involving tides and gravity waves. The tides are excited by the daytime heating of atmospheric ozone. Gravity waves are excited by meteorological fronts or by auroral disturbances. The ionosphere is also subJect to slow variations linked with the seasons or the solar cycle.

Several types of sounders are known, which make it possible to detect phenomena linked with the earth and its environment, particularly phenomena relating to the ionosphere. One of these known sounders is described in U.S. Pat. No. 4,356,487 in the name of the present Applicant and which uses the radar principle. This sounder comprises a channel for emitting electromagnetic signals in the direction of the ionosphere and a receiver making it possible to intercept the echoes of these signals on different layers of the ionosphere. The electromagnetic waves emitted are general pulse-modulated waves. These pulses are emitted in the direction of the ionosphere, where the phenomenon to be detected and the resulting echoes are intercepted by the receiver, which detects these echoes as a function of their amplitude, their frequency and their frequency shift. Knowing the pulse emission times and the reception times of the echoes thereof, together with their frequency, this detection makes it possible to determine the distance separating this phenomenon from the emitter. In the case of ionospheric sounding, an ionospheric layer only reflects the electromagnetic waves, whose frequency is below the critical frequency linked with the maximum electron density of said layer. The waves emitted at a predetermined frequency and below the critical frequency, supply echoes at a given time with respect to the emission time, so that it is possible to establish the altitude of the ionospheric region, whose electron density is that necessary for the reflection of the electromagnetic sounding wave. In order to give more information on the evolution of the phenomena studied and particularly the ionized regions, the sounder described in the aforementioned U.S. Patent also makes it possible to detect small electron density variations as a result of the use of the Doppler radar method. Such ionospheric electron density variations as a function of time lead to frequency shifts compared with the sounding frequency of the echoes resulting from the waves emitted in the direction of the atmosphere and this is called the Doppler effect.

The sounder makes it possible to observe very small frequency shifts corresponding to variations in the phase path of the electromagnetic sounding waves of approximately 1m/sec. Moreover, this sounder has a good spatial resolution determined by very small widths of the pulses emitted in the direction of the ionosphere.

At present, no receiver is known which permits, in a sounder emitting pulses on several sounding frequencies, to measure frequency shifts (Doppler effect) and also the envelope delays of the modulated signals emitted at different fixed frequencies. In general, these receivers are complicated and often the measurements are made impossible through the presence of distortions produced by the receiver and through the presence of high interference levels reaching the input thereof.

The obJect of the present invention is to obviate these disadvantages and in particular to provide a receiver for a sounder making it possible to detect and measure phenomena linked with the earth's environment. This receiver makes it possible to carry out measurements of Doppler frequencies and of envelope delays, without them being disturbed by the distortions produced by the receiver or by interference at its input. As will be shown in greater detail hereinafter, these obJectives are achieved through the use of attenuators, very accurate filters which are insensitive to interfering signals and phase-cohtrolled oscillators.

BRIEF SUMMARY OF THE INVENTION

The present invention specifically relates to a receiver for a sounder for the detection and measurement of phenomena linked with the earth's environment, wherein it comprises a reception channel, whereof one input receives the echo signals of the electromagnetic signals emitted towards the phenomenon, an electromagnetic signal frequency and amplitude-calibration test means, whereby the reception channel comprises a first stage having in series means for filtering, attenuating and amplifying the echo signals received, a second stage comprising in series means for the frequency conversion attenuation, filtering and amplification of the signals received from the first stage, and a third stage comprising in series means for frequency conversion, filtering and amplification of the signals received from the second stage, the attenuation means of the first and second stages being independently controllable for each frequency of the signals which they receive, in such a way that the signals from the corresponding amplification means have an amplitude higher than the amplitude of the distortions produced by the reception channel and the amplitude of the noise signals received by the reception channel.

According to another feature, the frequency conversion means of each of the second and third stages comprise a mixer making it possible to mix the signals received at an input with the reference frequency signals from an oscillator, the oscillators of the second and third stages being phase-controlled and supplying signals having different frequencies.

According to another feature, the filtering means are quartz filters with a constant envelope delay.

According to another feature, the attenuation means of the first stage are regulatable by voltage changing, each voltage being independently regulatable for each reception frequency of the echoes of said electromagnetic signals.

According to another feature, the attenuation means of the second stage are regulatable by automatic gain control.

According to another feature, the phase-controlled oscillators are frequency synthesizers respectively supplying at their outputs, signals having the said reference frequencies, said synthesizers being connected to a high sensitivity master oscillator.

According to another feature, the receiver also comprises a coaxial relay for connecting one output of the test and calibration channel to the input of the reception channel.

Finally, according to another feature, the receiver also comprises a fourth stage comprising in series, frequency conversion, filtering and amplification means receiving signals from the third stage, the frequency conversion means comprising a mixer receiving the signals from the third stage and an oscillator applying these signals having a different reference frequency to another input of this mixer, the reference frequency signals being supplied by another output of the frequency synthesizer connected to the master oscillator.

DESCRIPTION OF THE DRAWING AND PREFERRED EMBODIMENTS

The invention is described in greater detail hereinafter relative to non-limitative embodiments and with reference to the attached drawing, which diagrammatically shows a receiver according to the invention.

This receiver comprises a reception channel constituted by a plurality of stages 1, 2, 3, 4, which will be described in greater detail hereinafter. An input 5 of this reception channel receives via an antenna 6 echo pulse signals of the electromagnetic pulse signals emitted towards a phenomenon relating to the earth. This receiver also comprises an electromagnetic signal frequency shift and amplitude calibration test channel. This test channel is essentially formed by a simulator 7, which firstly makes it possible to check the operation of the reception channel by inJecting into it, via a coaxial relay 8, reference signals having a predetermined amplitude and frequency. It also makes it possible to calibrate the reception channel. For the study of a phenomenon, it is useful to be aware of the performances of the reception channel and particularly to be aware of the gain thereof for each of the frequencies of the signals received, as well as the precision in transmission of the frequency shifts of the signals received at its inputs. Thus, simulator 7 supplies signals of predetermined frequency and amplitude, as well as frequency-shifted signals. The reception channel comprises a first stage 1 having means for the filtering, attenuation and amplification of the echo signals received. The filtering means are constituted by a band-pass filter 9, whilst the attenuation means are constituted by a programmable attenuator 10 for the voltages which are applied thereto and which are respectively dependent on the reception levels of the predetermined frequencies of the input signals (or useful signals.). Thus, each of these voltages makes it possible to fix the attenuation coefficient, as a function of the frequency of the useful signals. The voltage control input of this attenuator is shown at 11. When the input of the receiver receives interfering signals, or when the distortion produced by the receiver is relatively high, this attenuator makes it possible to minimise the amplitude of this distortion or of these interfering signals compared with the amplitude of the useful signals received. The amplification means of this first stage are constituted by an amplifier 12. The reception channel also comprises a second stage 2, constituted by frequency conversion, attenuation, filtering and amplification means. The frequency conversion means are constituted by a mixer 13, which makes it possible to mix the signals supplied by the predetermined frequency amplifier 12 with signals having a reference frequency applied to an input 14 of the mixer, by an output of a local oscillator 15, which will be described hereinafter. The attenuation means are constituted by an automatic gain control attenuator 16, which receives the output signals from mixer 13 and makes it possible to regulate the level of the interfering signals of the reception channel. The regulation of this attenuator firstly consists of choosing a high attenuation level and then progressively reducing this level to a given threshold, so that when the input of the receiver receives the echo signals, the amplitude of these signals exceeds this threshold. The filtering means of the second stage are constituted by a quartz Bessel filter 17. This filter is followed by amplification means constituted in per se known manner by an amplifier 18 having automatic gain control 19. The third stage of the reception channel comprises frequency conversion, filtering and amplification means. The frequency conversion means comprise a mixer 20, which receives the output signals from amplifier 18 and signals having a predetermined frequency and which are supplied by a local oscillator 29 which will be described hereinafter. The output of this mixer is connected to the input of the filtering means constituted by a quartz Bessel filter 21. The output of this filter is connected to amplification means formed by an amplifier 22.

Finally, the reception channel comprises a fourth stage having frequency conversion, filtering and amplification means. The frequency conversion means are constituted by a mixer 23, which receives the output signals from amplifier 22, as well as reference frequency signals supplied by a local oscillator 24. The output of mixer 23 is connected to the filtering means constituted by a quartz Bessel filter 25. Finally, the output of filter 25 is connected to amplification means constituted by an amplifier 26. The output 27 of this amplifier forms the output of the reception channel. Oscillators 15, 16 and 24 of the second, third and fourth stages of the reception channel are in fact formed by frequency synthesizers controlled by a quartz oscillator 28 and supplying different frequency signals, so that these oscillators are phase-controlled.

The operation of the receiver will now be described on the basis of a specific embodiment which can be used in a sounder permitting the detection and measurement of phenomena relating to the earth's environment and particularly the measurement of phenomena relative to the ionosphere.

Filters 17, 21 and 25 are linear phase Bessel filters serving to transmit without rebound the signals received. Filters 9, 17 and 21 are band-pass filters. Filter 9 of the first stage 1 of the reception channel is a filter, whose pass-band is between 0.5 and 30 MHz, bearing in mind that the predetermined frequencies of the input signals are located in this frequency band. The attenuation of this filter is 0.1 dB (decibel). This filter is used for eliminating the image frequency of the frequency of the useful input signal of the receiver. As stated hereinbefore, the input signals of the receiver can have several predetermined frequencies, which are obviously dependent on the predetermined transmission frequencies. Attenuator 10 is connected to the filter 9 of the first stage and, as is indicated hereinbefore, has an attenuation level, which can be automatically regulated by voltages dependent on the reception levels of the predetermined frequencies of the signals received at the reception channel input. Thus, this attenuator is made necessary, because the amplitude of the signals received varies as a function of the predetermined frequencies of these signals. This attenuator can also be controlled with the timing of the predetermined frequency changes of the input signals. This attenuator has an attenuation coefficient varying between 1.5 and 30 dB. Amplifier 13 is connected to the output of attenuator 10 and is a wide-band amplifier with a gain of approximately 30 dB. However, it also has very large operating dynamics, because it remains linear up to a level close to 13 dBm (13 dB above 1 mW) at the output. Mixer 13 operates up to a level of 13 dB at its input and carries out the conversion of the reception frequency $Fe_e$ at 40 MHz by mixing with the sidnal supplied by oscillator 15, whose frequency is equal to $Fe_e + 40$ MHz. Thus, at the output of mixer 13, the frequency of the signals is equal to 40 MHz$\pm F_d$ ($F_d$ being the frequency shift between the signals emitted in the direction of a phenomenon and the signals received at the input of the reception channel). The mixer 13 has an attenuation coefficient close to 5 dB. The second stage is a medium frequency stage and operates at frequencies close to 40 MHz. Attenuator 16, whose attenuation level can vary between 2 and 24 dB, makes it possible to fix the gain of the reception channel in such a way that the interfering signals do not disturb the measurements performed at the output of the reception channel. Thus, this interference must not mask the useful signals received at the input of said channel. Filter 17 is a band-pass, quartz Bessel filter, whose band width varies between −86 kHz and +86 kHz about a centre frequency of 40 MHz. This filter has an attenuation coefficient of close to 4 dB and a linear phase response. The automatic gain control amplifier 18 is tuned to a frequency of 40 MHz and its gain can vary between 30 and 76 dB. This gain can be regulated in known manner by a control voltage applied to input 19. Mixer 20 makes it possible to mix the signals received from amplifier 18 with the signals produced by local oscillator 16, whose frequency is equal to 50 MHz. Thus, at the output of mixer 20, the signals have an average frequency of 10 MHz about which the shift frequencies vary. This mixer has an attenuation close to 5 dB. Filter 21, which is connected to mixer 20, defines the definitive pass band of the reception channel. It is in fact a band-pass filter, whose centre frequency is close to 10 MHz and whose pass band can vary between 2 and 60 kHz. It also has a linear phase response and the width of its pass band is linked with the width of the pulse signals received at the receiver input. Its attenuation coefficient is close to 7 dB. Amplifier 22, which is connected to filter 21, is also a linear amplifier tuned to the frequency of 10 MHz. Mixer 23, which is connected to the output of this amplifier, makes it possible to mix the signals coming from this amplifier with the signal supplied by local oscillator 24. The signals of this oscillator have a reference frequency of 9.9 MHz. Thus, the output signal of this mixer has a frequency varying around 100 kHz, as a function of the shift frequencies of these input signals. The mixer has an attenuation coefficient of approximately 7.5 dB. Filter 25, which is connected to the output of this mixer, is a low-pass filter, whose cutoff frequency is equal to 200 kHz. Filter 25 is a Bessel filter. Finally, the output of this filter is connected to a linear amplifier, whose gain is close to 20 dB. The output 27 of this amplifier supplies signals making it possible to perform frequency shift measurements on the input signals and consequently make it possible to interpret certain parameters of the phenomena studied. These signals have a frequency of close to 100 kHz for an amplitude close to 3 V r.m.s.

The phase control of the different local oscillators 11,16 and 24 is essential, because the reception frequencies of the input signals can vary from 0.5 to 30 MHz and because frequency shifts of approximately 1/10 Hz have to be analysed, particularly when studying the ionosphere. This phase control is brought about by direct synthesis, as a result of frequency synthesizers controlled by a quartz oscillator 28. This eliminates any risks of error on the frequency shift measurements. This result is important, because in known receivers, the local oscillators are not phase-controlled with respect to one another. In the receiver described hereinbefore, this control makes it possible to obtain a very considerable spectral purity and a very low residual phase noise. It must be possible to tune this receiver very rapidly to the reception frequency and this tuning takes place by means of a first local oscillator 15 at around 40 MHz. It implies that all the input stages are wide pass band stages. This makes it possible to eliminate the presence of all tunable filters at the head of the amplification chain in known receivers. Thus, it is possible to analyse input signals, whose amplitude is approximately a few microvolts in the presence of interfering signals of several dozen millivolts. This input signal can only be analysed if the input stages have a linear operating range and very large dynamics, as has been stated hereinbefore. In addition, the attenuators make it possible to attenuate the signal so as to place it in the linear operating range of the input stage. As this receiver is used for studying the echoes on the ionosphere of electromagnetic pulses lasting between 10 microseconds and a few hundred microseconds, it is important that the receiver does not deform these pulses and in particular introduces no rebounds on the pulses received. The presence of Bessel filters solves these problems.

We claim:

1. A receiver for a sounder for the detection and measurement of a phenomenon linked with the earth's environment, comprising: a reception channel having one input for receiving echo signals of electromagnetic signals emitted towards a phenomenon, means for calibrating the amplitude and frequency of signals to be received for providing a test signal of a predetermined amplitude and frequency, said reception channel comprising a first stage having in series means for filtering, attenuating and amplifying the echo signals received, a second stage connected in series with said first stage and comprising in series means for the frequency conversion, attenuation, filtering and amplification of the signals received from the first stage, and a third stage comprising in series means for frequency conversion, filtering and amplification of the signals received from the second stage, the attenuation means of the first and second stage being independently controllable for each frequency of the signals received, in such a way that the signals from the respective amplification means have an amplitude higher than the amplitude of distortions produced by the reception channel and the amplitude of noise signals received by the reception channel.

2. A receiver according to claim 1, wherein the frequency conversion means of each of the second and third stages comprise a mixer for mixing the signals received at an input with reference frequency signals from an oscillator received at another input, the oscillators of the second and third stages being phase-controlled and supplying signals having different frequencies.

3. A receiver according to claim 2, wherein the filtering means are quartz filters with a constant delay.

4. A receiver according to claim 2, wherein the attenuation means of the first stage comprises a control input supplied by a control voltage for regulating the attenuation for each reception frequency of the echoes of said electromagnetic signals received.

5. A receiver according to claim 2, wherein the attenuation means of the second stage are constituted by automatic gain control means.

6. A receiver according to claim 2, wherein the phase-controlled oscillators are frequency synthesizers respectively supplying at their outputs, signals having the said reference frequencies, said synthesizers being connected to a high sensitivity master oscillator.

7. A receiver according to claim 2, wherein the receiver also comprises a coaxial relay for connecting one output of the test and calibration channel to the input of the reception channel.

8. A receiver according to claim 6, wherein the receiver also comprises a fourth stage comprising in series, frequency conversion, filtering and amplification means receiving signals from the third stage, the frequency conversion means comprising a mixer receiving the signals from the third stage and an oscillator applying these signals having a different reference frequency to another input of this mixer, the reference frequency signals being supplied by another output of the frequency synthesizer connected to the master oscillator.

* * * * *